US010198088B2

(12) United States Patent
Yang et al.

(10) Patent No.: US 10,198,088 B2
(45) Date of Patent: Feb. 5, 2019

(54) NON-TRANSITORY COMPUTER READABLE RECORDING MEDIUM CAN PERFORM OPTICAL MOVEMENT QUALITY DETERMINING METHOD AND RELATED OPTICAL MOVEMENT DETECTING SYSTEM

(71) Applicant: PixArt Imaging Inc., Hsin-Chu (TW)

(72) Inventors: Chung-Ting Yang, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 16 days.

(21) Appl. No.: 15/427,067

(22) Filed: Feb. 8, 2017

(65) Prior Publication Data
US 2018/0113517 A1 Apr. 26, 2018

(30) Foreign Application Priority Data
Oct. 26, 2016 (TW) .............................. 105134530 A

(51) Int. Cl.
| | |
|---|---|
| *G06F 3/033* | (2013.01) |
| *G06F 3/0354* | (2013.01) |
| *G01N 21/94* | (2006.01) |
| *G06F 3/042* | (2006.01) |
| *G06F 3/03* | (2006.01) |

(52) U.S. Cl.
CPC ......... *G06F 3/03543* (2013.01); *G01N 21/94* (2013.01); *G06F 3/0317* (2013.01); *G06F 3/0421* (2013.01)

(58) Field of Classification Search
CPC .... G06F 3/0304; G06F 3/033; G06F 3/03542; G06F 3/03543; G06F 3/03547; G06F 3/038; G06F 3/042; G06F 3/0421; G06F 2203/0338; G01N 21/94
See application file for complete search history.

(56) References Cited

U.S. PATENT DOCUMENTS

| 4,807,166 A | * | 2/1989 | Zalenski | G06F 3/0317 250/221 |
| 2003/0020008 A1 | * | 1/2003 | Iwamoto | G06F 3/0423 250/221 |
| 2003/0075674 A1 | * | 4/2003 | Anderson | G06F 3/0317 250/221 |
| 2003/0184521 A1 | * | 10/2003 | Sugita | G06F 3/03543 345/163 |
| 2004/0130532 A1 | * | 7/2004 | Gordon | G06F 1/3203 345/166 |

(Continued)

*Primary Examiner* — Michael J Eurice
(74) *Attorney, Agent, or Firm* — Winston Hsu

(57) ABSTRACT

A non-transitory computer readable recording medium, for storing at least one program, an optical movement quality determining method is performed if the program is executed, wherein the optical movement quality determining method is applied to an optical movement detecting apparatus configured to generate optical information and to determine a relative location between an object and the optical movement detecting apparatus, wherein the optical movement quality determining method comprises: (a) determining information quality of the optical information; and (b) generating at least one movement quality reminding message according to a relation between the information quality and a quality threshold value.

16 Claims, 5 Drawing Sheets

(56) References Cited

U.S. PATENT DOCUMENTS

| | | | | |
|---|---|---|---|---|
| 2005/0203749 A1* | 9/2005 | Miyata | .................... | G10L 15/22 |
| | | | | 704/275 |
| 2008/0238876 A1* | 10/2008 | Moyer | .................. | G06F 3/0317 |
| | | | | 345/166 |
| 2009/0267895 A1* | 10/2009 | Bunch | ................... | G06F 3/0386 |
| | | | | 345/157 |
| 2010/0060567 A1* | 3/2010 | Larsen | ................. | G06F 3/0317 |
| | | | | 345/156 |
| 2010/0242274 A1* | 9/2010 | Rosenfeld | .......... | G06F 3/03543 |
| | | | | 29/848 |
| 2012/0326982 A1* | 12/2012 | Pasquero | ............... | G06F 3/016 |
| | | | | 345/161 |

* cited by examiner

NON-TRANSITORY COMPUTER READABLE RECORDING MEDIUM CAN PERFORM OPTICAL MOVEMENT QUALITY DETERMINING METHOD AND RELATED OPTICAL MOVEMENT DETECTING SYSTEM

BACKGROUND OF THE INVENTION

1. Field of the Invention

The present invention relates to an optical movement quality detecting method and an optical movement detecting apparatus applying the optical movement quality detecting method, particularly relates to an optical movement quality detecting method which can automatically generates a movement quality reminding signal and an optical movement detecting apparatus applying the optical movement quality detecting method.

2. Description of the Prior Art

Following the development of techniques, optical mice gradually substitutes conventional mice. Accordingly, the user cares a lot for the movement quality (ex. sensitivity or accuracy) of the optical mouse. Particularly, in some specific situations (ex. game competition), a high level of movement quality is needed.

However, a conventional optical mouse does not automatically show a movement quality thereof, thus complicated software is needed to determine if the movement quality of the optical mouse falls in a predetermined range. Accordingly, the detecting for movement quality of optical mice needs much time. If a user managing a plurality of optical mice, for example, an internet cafe manager, needs to spend a lot of time and effort to check movement quality of optical mice.

SUMMARY OF THE INVENTION

Therefore, one objective of the present invention is to provide an optical movement quality determining method, which can automatically generating a movement quality reminding message.

Another objective of the present invention is to provide an optical movement determining system, which can automatically generating a movement quality reminding message.

One embodiment of the present invention provides a non-transitory computer readable recording medium, for storing at least one program, an optical movement quality determining method is performed if the program is executed, wherein the optical movement quality determining method is applied to an optical movement detecting apparatus configured to generate optical information and to determine a relative location between an object and the optical movement detecting apparatus, wherein the optical movement quality determining method comprises: (a) determining information quality of the optical information; and (b) generating at least one movement quality reminding message according to a relation between the information quality and a quality threshold value.

In view of above-mentioned embodiments, the movement quality of an optical movement detecting apparatus can be automatically shown. By this way the user can acquire the movement quality efficiently without complicated steps.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. Please note, the components illustrated in following embodiments, such as a system, a module, or a unit, can be implemented via hardware (ex. circuit), and can be implemented via hardware with software (ex. a program installed to a processor).

Figure 1:
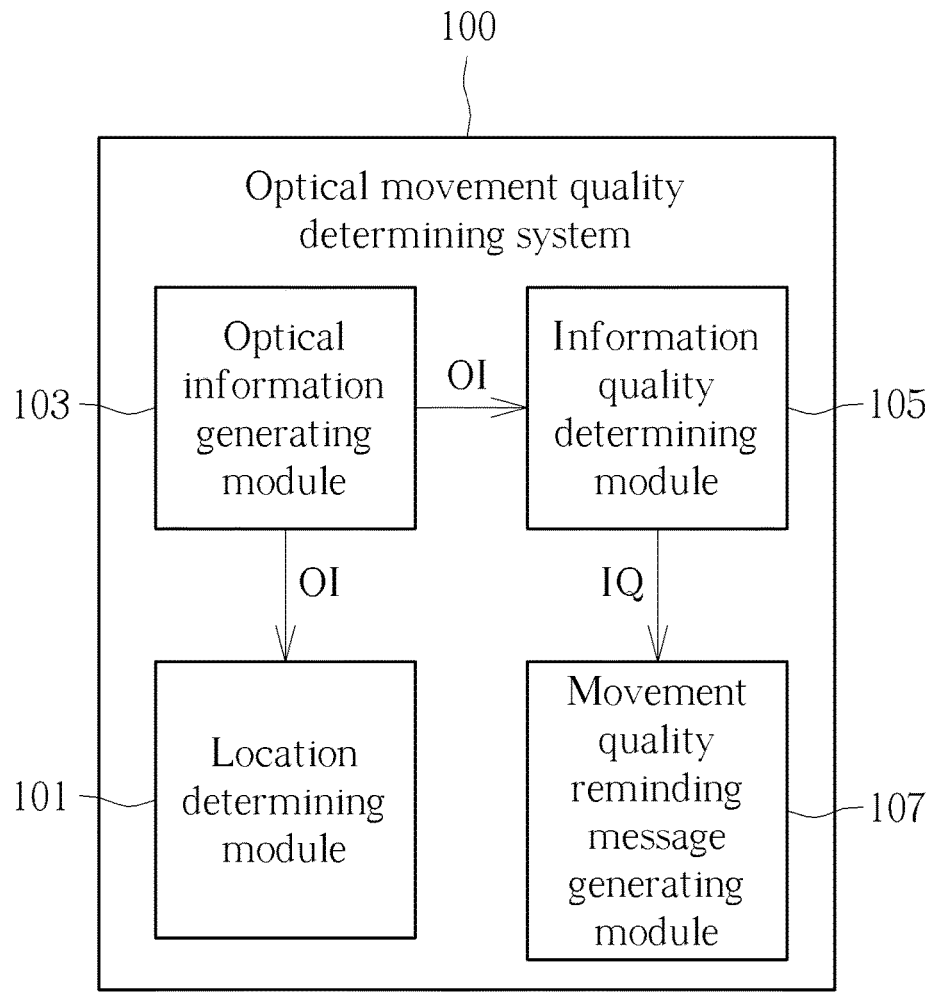
FIG. 1 is a block diagram illustrating an optical movement quality determining system according to one embodiment of the present invention.

FIG. 1 is a block diagram illustrating an optical movement quality determining system according to one embodiment of the present invention. As illustrated in FIG. 1, the optical movement quality determining system 100 comprises a location determining module 101, an optical information generating module 103, an information quality determining module 105 and a movement quality reminding message generating module 107. The optical information generating module 103 is provided in an optical movement detecting apparatus, configured to generate optical information OI. The location determining module 101 determines a relative location between an object and the optical movement detecting apparatus according to the optical information OI. The information quality determining module 105 is configured to determine information quality IQ of the optical information OI. The movement quality reminding message generating module 107 is configured to generate at least one movement quality reminding message according to a relation between the information quality IQ and a quality threshold value. The movement quality reminding message can be light, a voice, or images, such that the user can acquire a movement quality of the optical movement detecting apparatus.

In one embodiment, the above-mentioned optical information generating module 103 is an image sensor, and the optical information OI is a sensing image captured by the optical information generating module 103. In such example, the information quality IQ is image quality for sensing images. Also, the optical movement detecting apparatus can be an optical navigating apparatus (ex. an optical mouse) or an optical touch control apparatus. Besides, the above-mentioned object can be a finger or a surface, such as a desk surface that the optical mouse is provided on. Related contents will be described for more detail below. In this embodiment, since the relative location between the object and the optical movement detecting apparatus is based on the sensing images, the quality for sensing images is directly proportional to the movement quality of the optical movement detecting apparatus. However, the image quality may be affected by various kinds of factors. For example, a dirty condition for the surface that the optical movement detecting apparatus is put on, or a dirty condition for a lens which the image sensor applies to capture sensing images.

Many methods can be applied to compute image quality of sensing images. In one embodiment, a number for decreasing or increasing for grey levels of neighboring pixels in each row of a sensing image is computed, and such result is multiplied by a weighting value to acquire an image quality parameter IP. The higher the image quality parameter IP, the better the image quality is. The reason for why the image quality can be determined by this way is: the image is clear if the image has a better image quality, thus variation for the grey levels of neighboring pixels is more obvious. On the opposite, the image is blurred if the image has a poor image quality, thus variation for the grey levels of neighboring pixels is non-obvious.

In another embodiment, the sensing image is firstly processed by a filter to filter noise in the sensing image. After that, each of the pixel grey levels for the sensing image is compared with a predetermined value, which has a larger value (i.e. brighter, such as 180). If the pixel grey level is lower than the predetermined value, a counting value of the counter increases by 1. The lower the counting value, the better the image quality is. The reason for why the image quality can be determined by this way is: a sensing image having better image quality always has a dark region image, rather than the whole sensing image is bright. Oppositely, if almost the whole sensing image is bright, it means the image is blurred and has a poor image quality.

Figure 2:
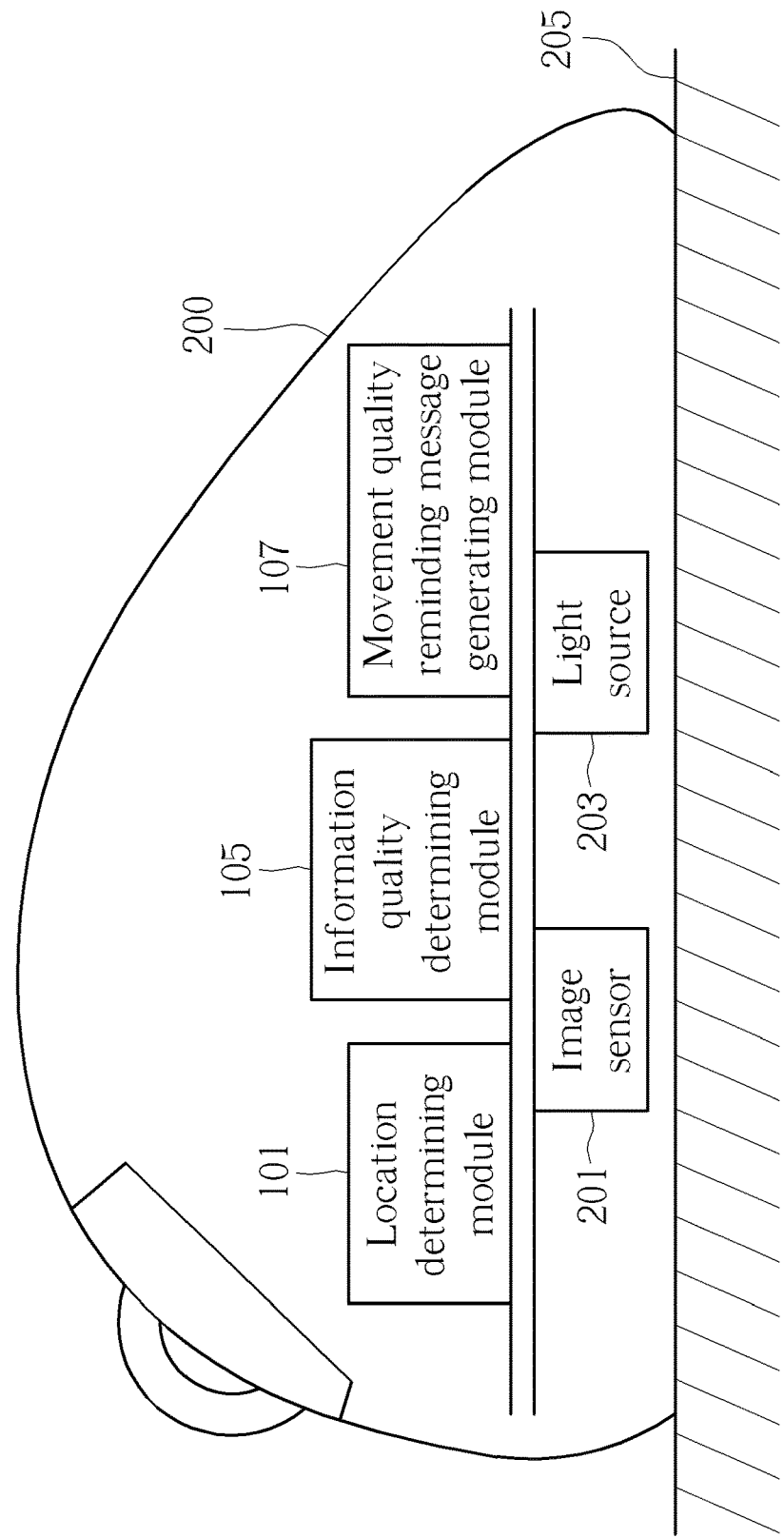
FIG. 2 is a schematic diagram illustrating an optical mouse applying the optical movement quality determining system illustrated in FIG. 1.

FIG. 2 is a schematic diagram illustrating an optical mouse applying the optical movement quality determining system illustrated in FIG. 1. As illustrated in FIG. 2, the optical information generating module 103 in FIG. 1 is implemented by an image sensor 201 in FIG. 2. The light source 203 provides light to a surface 205 (ex. a desk surface that the optical mouse 200 is put on). The image sensor 201 is configured to capture a sensing image comprising an image for the surface 205. The location determining module 101 determines a relative location between the surface 205 (i.e. the above-mentioned object) and the optical mouse 200 according to the sensing images captured by the image sensor 201. The information quality determining module 105 is configured to determine image quality of the sensing image captured by the image sensor 201. The movement quality reminding message generating module 107 is configured to generate at least one movement quality reminding message according to a relation between the image quality and a quality threshold value.

Figure 3:
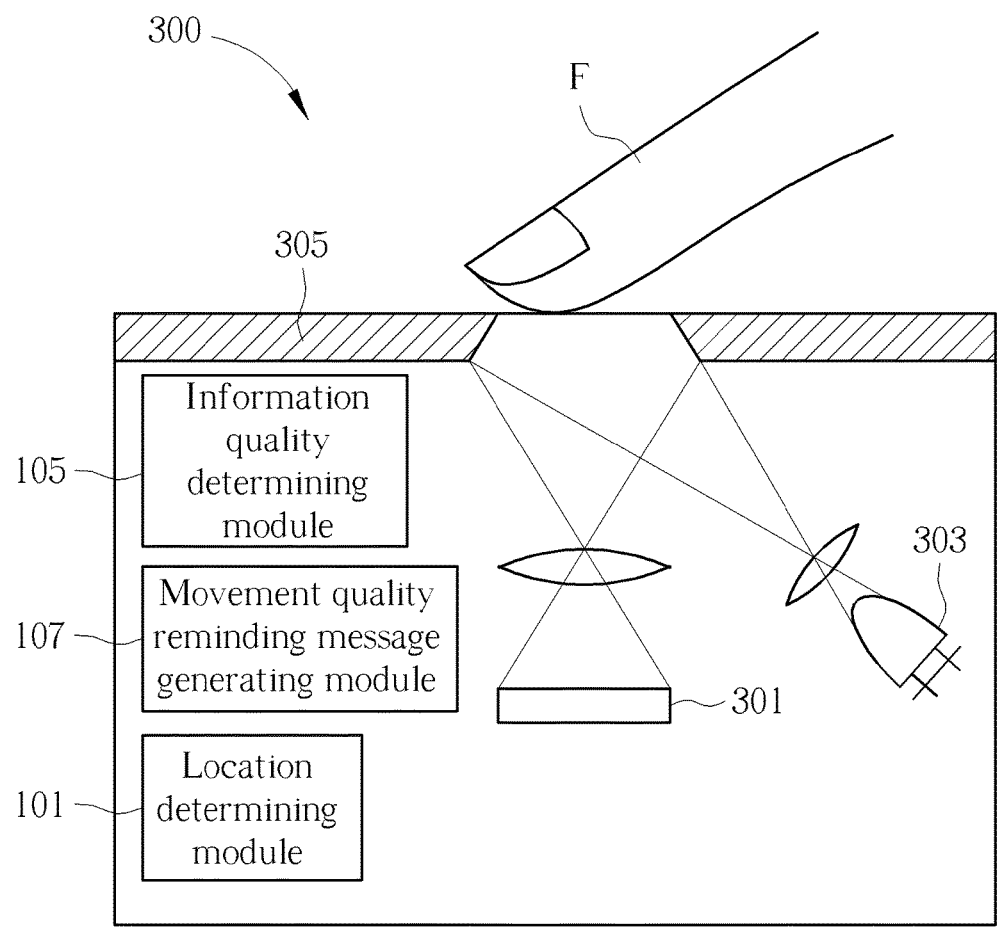
FIG. 3 is a schematic diagram illustrating an optical touch control apparatus applying the optical movement quality determining system illustrated in FIG. 1.

Besides the optical mouse illustrated in FIG. 2, the optical movement quality determining system 100 illustrated in FIG. 1 can be applied to an optical touch control apparatus. FIG. 3 is a schematic diagram illustrating an optical touch control apparatus 300 applying the optical movement quality determining system illustrated in FIG. 1. As illustrated in FIG. 3, the optical information generating module 103 in FIG. 1 is implemented by an image sensor 301 in FIG. 3. The light source 303 provides light to a finger F on a sensing surface 305. The image sensor 301 is configured to capture a sensing image comprising an image for the finger F. The location determining module 101 determines a relative location between the finger F (i.e. the above-mentioned object) and the sensing surface 305 according to the sensing images captured by the image sensor 301. The information quality determining module 105 is configured to determine image quality of the sensing image captured by the image sensor 301. The movement quality reminding message generating module 107 is configured to generate at least one movement quality reminding message according to a relation between the image quality and a quality threshold value.

Please note, the optical information generating module 103 in FIG. 1 can be applied to an optical navigating apparatus or an optical touch control apparatus, which have structures different from structures illustrated in FIG. 2 and FIG. 3. In following descriptions, different embodiments are provided to explain the above-mentioned movement quality reminding message. It will be appreciated although an optical mouse is used as an example to explain following embodiments, the following embodiments can be applied to an optical touch control apparatus as well.

Figure 4:
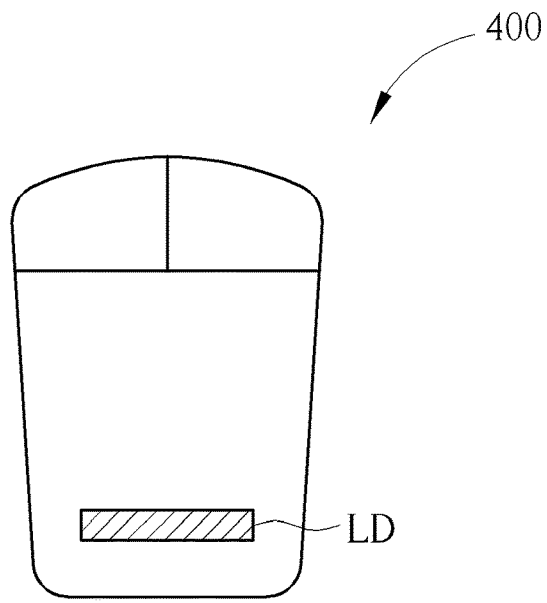
FIG. 4 is a schematic diagram illustrating an optical movement quality determining method according to one embodiment of the present invention.

FIG. 4 is a schematic diagram illustrating an optical movement quality determining method according to one embodiment of the present invention. In one embodiment, the movement quality reminding message is light from at least one light emitting device. As illustrated in FIG. 4, the optical mouse 400 comprises a light emitting device LD, which emits light according to the above-mentioned relation between the information quality and the quality threshold value. In one embodiment, if the information quality is lower than quality threshold value, which means the movement quality is poor, the light emitting device LD emits light, to remind the user to check the optical mouse 400 or a surface on which the optical mouse moves. In another embodiment, if the information quality is not lower (i.e. higher or equal) than quality threshold value, which means the movement quality is in an acceptable range, the light emitting device LD emits light. In such embodiment, the light emitting device LD stops emitting light if the information quality is lower than quality threshold value, to remind the user to check the optical mouse 400 or a surface on which the optical mouse moves.

In one embodiment, the information quality has a plurality of sates, and the movement quality reminding message correspondingly comprises different messages. Take FIG. 4 for example, the information quality can have three levels: high, medium and low. The light emitting device LD emits green light if the information quality is high, the light emitting device LD emits yellow light if the information quality is medium, and the light emitting device LD emits red light if the information quality is low. In another embodiment, the light emitting device LD emits orange light if the information quality determining module determines a plurality of sensing images are too dark. Also, in the same embodiment, the light emitting device LD emits purple light if the information quality determining module determines a plurality of sensing images have low contrasts. By this way, the user can efficiently determine information quality for the optical mouse. Such embodiment can be summarized as: The movement quality reminding message comprises a first mode reminding message and a second mode reminding message. The movement quality reminding message generating module generates the first mode reminding message if the information quality is a first state. Also, the movement quality reminding message generating module generates the second mode reminding message if the information quality is a second state.

Figure 5:
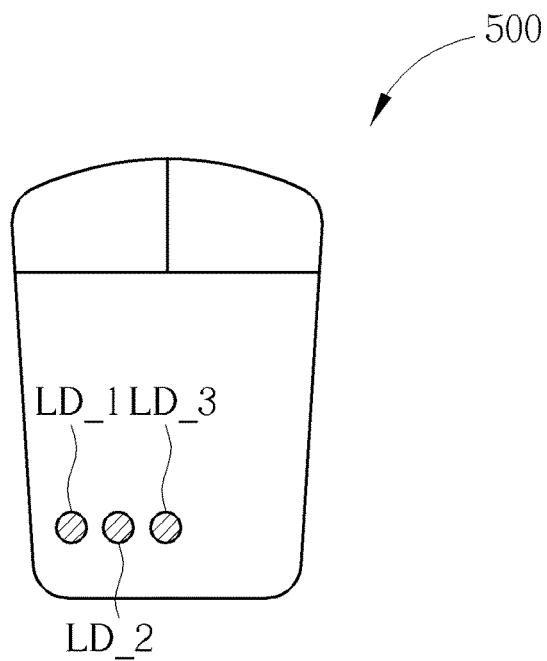
FIG. 5 is a schematic diagram illustrating an optical movement quality determining method according to another embodiment of the present invention.

The above-mentioned optical device is not limited to only one optical device. As illustrated in FIG. 5, the optical mouse 500 comprises a plurality of light emitting devices LD_1, LD_2 and LD_3. The operations for the light emitting devices LD_1, LD_2 and LD_3 are the same as the operations illustrated in FIG. 4. That is, in one embodiment, at least one of the light emitting devices LD_1, LD_2 and LD_3 emits light if the information quality is lower than the quality threshold value (i.e. the movement quality is poor). In another embodiment, at least one of the light emitting devices LD_1, LD_2 and LD_3 emits light if the information quality is not lower than the quality threshold value, and at least one of the light emitting devices LD_1, LD_2 and LD_3 stops emitting light if the information quality is lower than the quality threshold value. Similarly, the embodiment in FIG. 5 can apply the above-mentioned embodiment "the information quality has a plurality of sates, and the movement quality reminding message correspondingly comprises different messages." For example, the information quality can have three levels: high, medium and low. Only the light emitting device LD_1 emits light if the information quality is high, the light emitting devices LD_1, LD_2 emits light if the information quality is medium, and all the light emitting devices LD_1, LD_2, LD_3 emits light if the information quality is low. In another embodiment, the light emitting device LD_1 emits light if the information quality determining module determines a plurality of sensing images are too dark. Also, in the same embodiment, the light emitting devices LD_1, LD_2 emit plight if the information quality determining module determines a plurality of sensing images have low contrasts. By this way, the user can efficiently determine information quality for the optical mouse.

Figure 6:
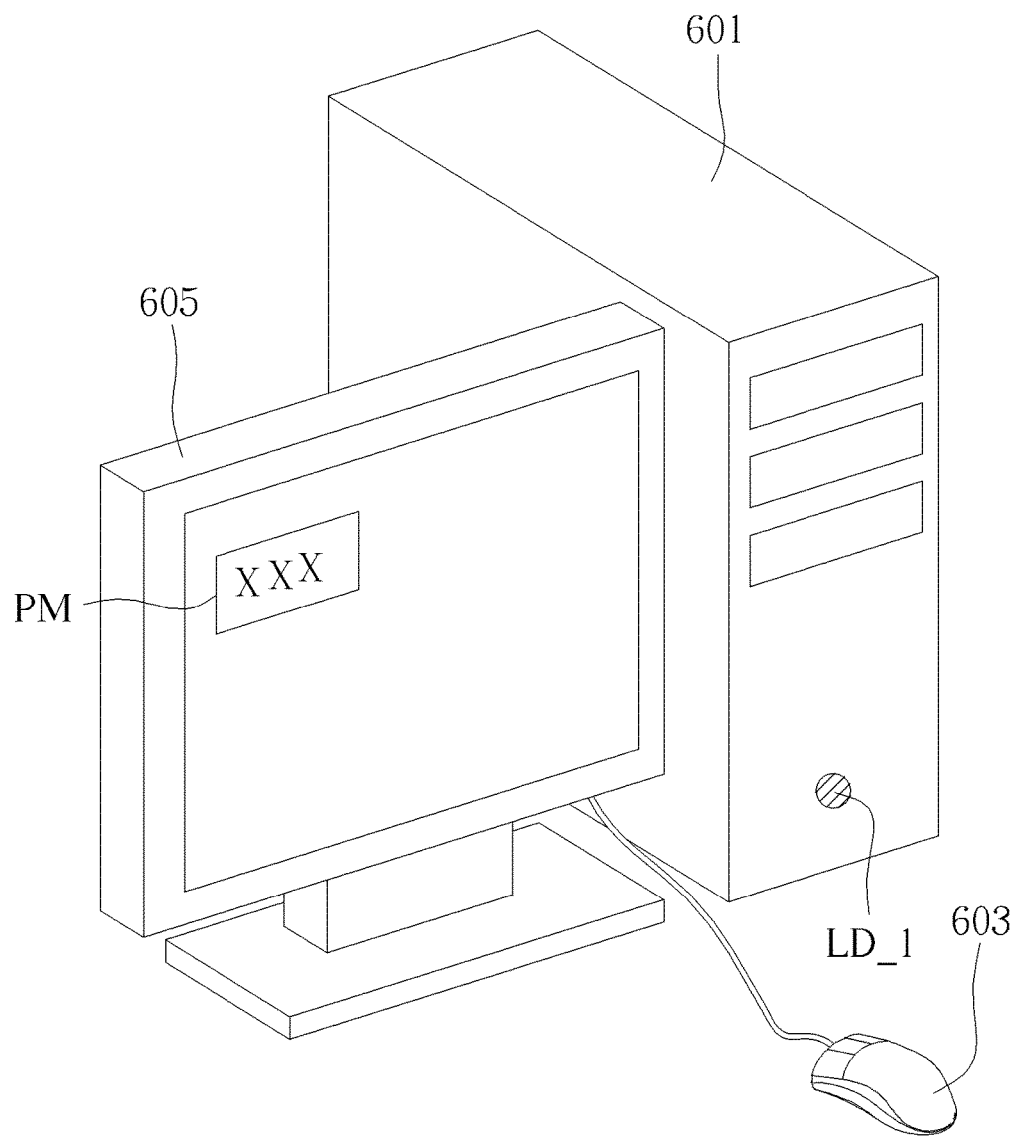
FIG. 6 is a schematic diagram illustrating a movement quality reminding message according to one embodiment of the present invention.

In above-mentioned embodiments, the light emitting devices are all provided in the optical mouse, but the light emitting devices are provided in apparatuses besides the optical mouse. Take FIG. 6 for example, the light emitting device LD_1 is provided in the host 601, and the optical mouse 603 is coupled to the host 601 via wire-connection, or wireless-connection. The host 601 performs different operations corresponding to control signals from the optical mouse 603. For example, the cursor on the display can move corresponding to the movement of the optical mouse 601. In such embodiment, the optical mouse 603 still comprises the above-mentioned optical information generating module and the information quality determining module. Also, the light emitting device LD_1 on the host 601 emits light according to a relation between information quality generated by the information quality determining module and a quality threshold value.

In one embodiment, the host 601 and the optical mouse 603 both comprise light emitting devices, which simultaneously emit light or not according to relation between information quality generated by the information quality determining module and a quality threshold value. By this way, the user can be efficiently reminded that the optical mouse 603 may have a poor movement quality.

In above-mentioned embodiments, the light is applied as the movement quality reminding message. However, the movement quality reminding message can by other types of messages. For example, in one embodiment the movement quality reminding message is a voice. In another embodiment, the movement quality reminding message is a message that can be displayed, such as the movement quality reminding message PM, which is displayed on a display 605 and can be a character message or an image message.

Please note persons skilled in the art can combine or modify the above-mentioned embodiments. Such variation should also fall in the scope of the present invention. The above-mentioned embodiments can be summarized as an optical movement quality determining method applied to an optical movement detecting apparatus configured to generate optical information (ex. sensing image) and to determine a relative location between an object and the optical movement detecting apparatus. The optical movement quality determining method comprises: (a) determining information quality of the optical information; and (b) generating at least one movement quality reminding message according to a relation between the information quality and a quality threshold value. The optical movement quality determining method can be performed via a computer readable recording medium, but not limited. For example, a program is stored to an optical disc or a storage device, the above-mentioned method can be performed if the program is executed.

In view of above-mentioned embodiments, the movement quality of an optical movement detecting apparatus can be automatically shown. By this way the user can acquire the movement quality efficiently without complicated steps.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium, for storing at least one program, an optical movement quality determining method is performed if the program is executed, wherein the optical movement quality determining method is applied to an optical movement detecting apparatus configured to generate optical information and to determine a location of the optical movement detecting apparatus on an object or a location of the object on the optical movement detecting apparatus, wherein the optical movement quality determining method comprises:

(a) determining information quality of the optical information; and (b) generating at least one optical movement quality reminding message according to a relation between the information quality and a quality threshold value when light from the optical movement detecting apparatus can reach the object and the optical information can be generated based on the light from the optical movement detecting apparatus;

wherein the optical movement quality reminding message is light generated by at least one light emitting device or a voice;

wherein a user can acquire an optical movement quality of the optical movement detecting apparatus according to the optical movement quality reminding message.

2. The non-transitory computer readable recording medium of claim 1, wherein the optical information is a sensing image, and the information quality is image quality of the sensing image.

3. The non-transitory computer readable recording medium of claim 1, wherein the light emitting device is provided in the optical movement detecting apparatus.

4. The non-transitory computer readable recording medium of claim 1, wherein the light emitting device is provided to a host, wherein the host performs different operations corresponding to control signals output by the optical movement detecting apparatus.

5. The non-transitory computer readable recording medium of claim 1, wherein the step (b) comprises: controlling the optical movement detecting apparatus and a host to simultaneously generate the optical movement quality reminding message, wherein the host performs different operations corresponding to control signals of the optical movement detecting apparatus.

6. The non-transitory computer readable recording medium of claim 1, wherein the optical movement quality reminding message further comprises a character message or an image message displayed on a display.

7. The non-transitory computer readable recording medium of claim 1, wherein the optical movement quality reminding message comprises a first mode reminding message and a second mode reminding message, wherein the step (b) generates the first mode reminding message when the information quality is a first state, wherein the step (b) generates the second mode reminding message when the information quality is a second state.

8. The non-transitory computer readable recording medium of claim 1, wherein the optical movement detecting apparatus is an optical navigating apparatus or an optical touch control apparatus.

9. An optical movement quality determining system, comprising:
 a location determining module;
 an optical information generating module, provided in an optical movement detecting apparatus, configured to generate optical information, wherein the location determining module determines a location of the optical movement detecting apparatus on the object or a location of the object on the optical movement detecting apparatus;
 an information quality determining module, configured to determine information quality of the optical information; and
 at least one optical movement quality reminding message generating module, configured to generate at least one optical movement quality reminding message according to a relation between the information quality and a quality threshold value when light from the optical movement detecting apparatus can reach the object and the optical information can be generated based on the light from the optical movement detecting apparatus;
 wherein the optical movement quality reminding message is light generated by at least one light emitting device or a voice;
 wherein a user can acquire an optical movement quality of the optical movement detecting apparatus according to the optical movement quality reminding message.

10. The optical movement quality determining system of claim 9, wherein the optical information is a sensing image, and the information quality is image quality of the sensing image.

11. The optical movement quality determining system of claim 9, wherein the light emitting device is provided in the optical movement detecting apparatus.

12. The optical movement quality determining system of claim 9, wherein the light emitting device is provided to a host, wherein the host performs different operations corresponding to control signals output by the optical movement detecting apparatus.

13. The optical movement quality determining system of claim 9, wherein the optical movement detecting apparatus and a host respectively comprises one of the optical movement quality reminding message generating modules, wherein the optical movement quality reminding message generating modules of the host and the optical movement detecting apparatus simultaneously generate the optical movement quality reminding message when the information quality is lower than a quality threshold value, wherein the host performs different operations corresponding to control signals of the optical movement detecting apparatus.

14. The optical movement quality determining system of claim 9, wherein the optical movement quality reminding message further comprises a character message or an image message displayed on a display.

15. The optical movement quality determining system of claim 9, wherein the optical movement quality reminding message comprises a first mode reminding message and a second mode reminding message, wherein the optical movement quality reminding message generating module generates the first mode reminding message when the information quality is a first state, wherein the optical movement quality reminding message generating module generates the second mode reminding message if the information quality is a second state.

16. The optical movement quality determining system of claim 9, wherein the optical movement detecting apparatus is an optical navigating apparatus or an optical touch control apparatus.

* * * * *